United States Patent
Odaohhara

(10) Patent No.: US 9,337,735 B2
(45) Date of Patent: May 10, 2016

(54) DC/DC CONVERTER WITHIN A PORTABLE COMPUTER

(75) Inventor: Shigefumi Odaohhara, Yamato (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 1645 days.

(21) Appl. No.: 12/621,921

(22) Filed: Nov. 19, 2009

(65) Prior Publication Data

US 2010/0295521 A1 Nov. 25, 2010

(30) Foreign Application Priority Data

Feb. 2, 2009 (JP) .................................. 2009-021895

(51) Int. Cl.
| | | |
|---|---|---|
| H02M 3/158 | (2006.01) | |
| G06F 1/26 | (2006.01) | |
| H02M 1/00 | (2006.01) | |
| H02M 1/088 | (2006.01) | |

(52) U.S. Cl.
CPC .............. *H02M 3/1584* (2013.01); *G06F 1/26* (2013.01); *H02M 1/088* (2013.01); *H02M 2001/0032* (2013.01); *Y02B 70/16* (2013.01)

(58) Field of Classification Search
CPC .................. H02M 3/1584; H02M 2001/0032; H02M 1/088
USPC .................................. 323/282, 284, 285, 288
See application file for complete search history.

(56) References Cited

U.S. PATENT DOCUMENTS

| | | | | |
|---|---|---|---|---|
| 6,597,157 B1* | 7/2003 | Boeckmann | ............ | G05F 1/618 323/242 |
| 7,166,992 B2* | 1/2007 | Kudo | ................. | H02M 3/1588 323/282 |
| 7,368,991 B2* | 5/2008 | Swanson | .................... | H03F 1/12 327/309 |
| 7,498,783 B2* | 3/2009 | Johnson | ................... | H02M 1/15 323/272 |
| 7,564,228 B2* | 7/2009 | Yabuzaki | ............... | H02M 3/158 323/258 |
| 7,622,820 B1* | 11/2009 | Prodic | ................... | H02M 3/156 307/31 |
| 7,638,991 B1* | 12/2009 | Kobayashi | ..................... | 323/272 |
| 2006/0208715 A1* | 9/2006 | Saeki | .................. | H02M 3/1588 323/282 |
| 2008/0007236 A1* | 1/2008 | Elbanhawy | ........... | H02M 3/157 323/283 |

FOREIGN PATENT DOCUMENTS

| | | |
|---|---|---|
| JP | 04-033522 | 2/1992 |
| JP | 11-155281 | 6/1999 |

(Continued)

*Primary Examiner* — Jue Zhang
*Assistant Examiner* — Lakaisha Jackson
(74) *Attorney, Agent, or Firm* — Antony P. Ng; Russell Ng PLLC

(57) ABSTRACT

A DC/DC converter is disclosed. The DC/DC converter includes a first heavy-load electronic switch and a second heavy-load electronic switch connected in series between an input terminal and ground at a first output portion, a third light-load electronic switch and a fourth light-load electronic switch connected in series between the input terminal and ground at a second output portion, an output circuit, an output current measurement circuit, and a control circuit. The output circuit includes an inductor connected to the first and second output portions. The output current measurement circuit measures an output current. The control circuit, in response to an output of the output current measurement circuit, selects a combination of the first and second heavy-load electronic switches during a heavy load state, and selects a combination of the third and fourth light-load electronic switch during a light load state.

4 Claims, 5 Drawing Sheets

(56) References Cited

FOREIGN PATENT DOCUMENTS

| JP | 2001-103740 | 4/2001 |
| JP | 2002-058238 | 2/2002 |
| JP | 2005-287293 | 10/2005 |
| JP | 2006-296186 | 10/2006 |
| JP | 2008-072872 | 3/2008 |
| WO | 97-44884 | 11/1997 |

* cited by examiner

| FET CHARACTERISTICS | UNIT | FET103 | FET105 | FET107 | FET109 |
|---|---|---|---|---|---|
| ON-RESISTANCE Ron | mΩ | 10 | 7 | 70 | 70 |
| GATE CHARGE AMOUNT Qg | nC | 20 | 17 | 4 | 4 |
| TURN-ON TIME tr | ns | 5 | 6 | 10 | 10 |
| TURN-OFF TIME tf | ns | 10 | 11 | 10 | 10 |

FIG. 5A

| FET CHARACTERISTICS | (A) | | (B) | | (C) | | (D) | |
|---|---|---|---|---|---|---|---|---|
| | FET103 | FET105 | FET107 | FET109 | FET107 | FET105 | FET103 | FET109 |
| CONDUCTION LOSS Pc (mW) | 0.0 | 0.1 | 0.3 | 0.3 | 0.3 | 0.1 | 0.0 | 0.3 |
| GATE CHARGE LOSS Pgc (mW) | 40.0 | 34.0 | 8.0 | 8.0 | 8.0 | 34.0 | 40.0 | 8.0 |
| SWITCHING LOSS Psw (mW) | 4.5 | – | 6.0 | – | 6.0 | – | 4.5 | – |
| TOTAL LOSS PER ELEMENT (mW) | 44.5 | 34.1 | 14.3 | 8.6 | 14.3 | 34.1 | 44.5 | 8.6 |
| TOTAL LOSS OF HIGH/LOW SIDES (mW) | 78.6 | | 22.9 | | 58.4 | | 53.1 | |
| PERCENTAGE (%) | 100 | | 29.3 | | 74.2 | | 67.6 | |

FIG. 5B

| FET CHARACTERISTICS | FET103 | FET105 |
|---|---|---|
| CONDUCTION LOSS Pc (mW) | 433.3 | 607.6 |
| GATE CHARGE LOSS Pgc (mW) | 40.0 | 34.0 |
| SWITCHING LOSS Psw (mW) | 450.0 | – |
| TOTAL LOSS PER ELEMENT (mW) | 923.3 | 640.7 |
| TOTAL LOSS OF HIGH/LOW SIDES (mW) | 1564 | |

DC/DC CONVERTER WITHIN A PORTABLE COMPUTER

PRIORITY CLAIM

The present application claims benefit of priority under 35 U.S.C. §§120, 365 to the previously filed Japanese Patent Application No. JP2009-021895 entitled, "DC/DC Converter and Portable Computer" with a priority date of Feb. 2, 2009, which is incorporated by reference herein.

BACKGROUND

1. Technical Field

The present invention relates to a portable computer having a DC/DC converter in general, and in particular to a method for improving the efficiency of the DC/DC converter operating in a light load state.

2. Description of Related Art

A series regulator or a switching regulator can be used as a direct current (DC) regulator power supply. But switching regulators are more widely used in a notebook personal computer (notebook PC) because of their high efficiency and light weight compared to series regulators. A switching regulator controls the switching of a switching element in an operation mode, such as a Pulse Width Modulation (PCM) mode or a Pulse Frequency Modulation (PFM) mode, to produce a constant DC voltage.

Specifically, in the PWM mode, the On periods are controlled while maintaining the switching frequency that corresponds to the frequency of turning ON/OFF the switching element constant. In the PFM mode, the Off periods are controlled by maintaining the On periods constant, thereby controlling the average secondary-side voltage to be within a predetermined range when the primary-side voltage is changed. In the PWM mode and the PFM mode, the On periods and the Off periods are constant when the input voltage and the output voltage are constant. There is a limit on decreasing the lower limit of the switching frequency because it is necessary to suppress the ripple voltage or decrease the size of the elements of a smoothing circuit. Moreover, switching elements produce a loss, resulting from the switching frequency.

SUMMARY

In accordance with a preferred embodiment of the present invention, a DC/DC converter includes a first heavy-load electronic switch and a second heavy-load electronic switch connected in series between an input terminal and ground at a first output portion, a third light-load electronic switch and a fourth light-load electronic switch connected in series between the input terminal and ground at a second output portion, an output circuit, an output current measurement circuit, and a control circuit. The output circuit includes an inductor connected to the first and second output portions. The output current measurement circuit measures an output current. The control circuit, in response to an output of the output current measurement circuit, selects a combination of the first and second heavy-load electronic switches during a heavy load state, and selects a combination of the third and fourth light-load electronic switch during a light load state.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 5A and 5B are tables showing calculation examples of FET losses;

DETAILED DESCRIPTION OF A PREFERRED EMBODIMENT

Configuration of Notebook PC

Figure 1:
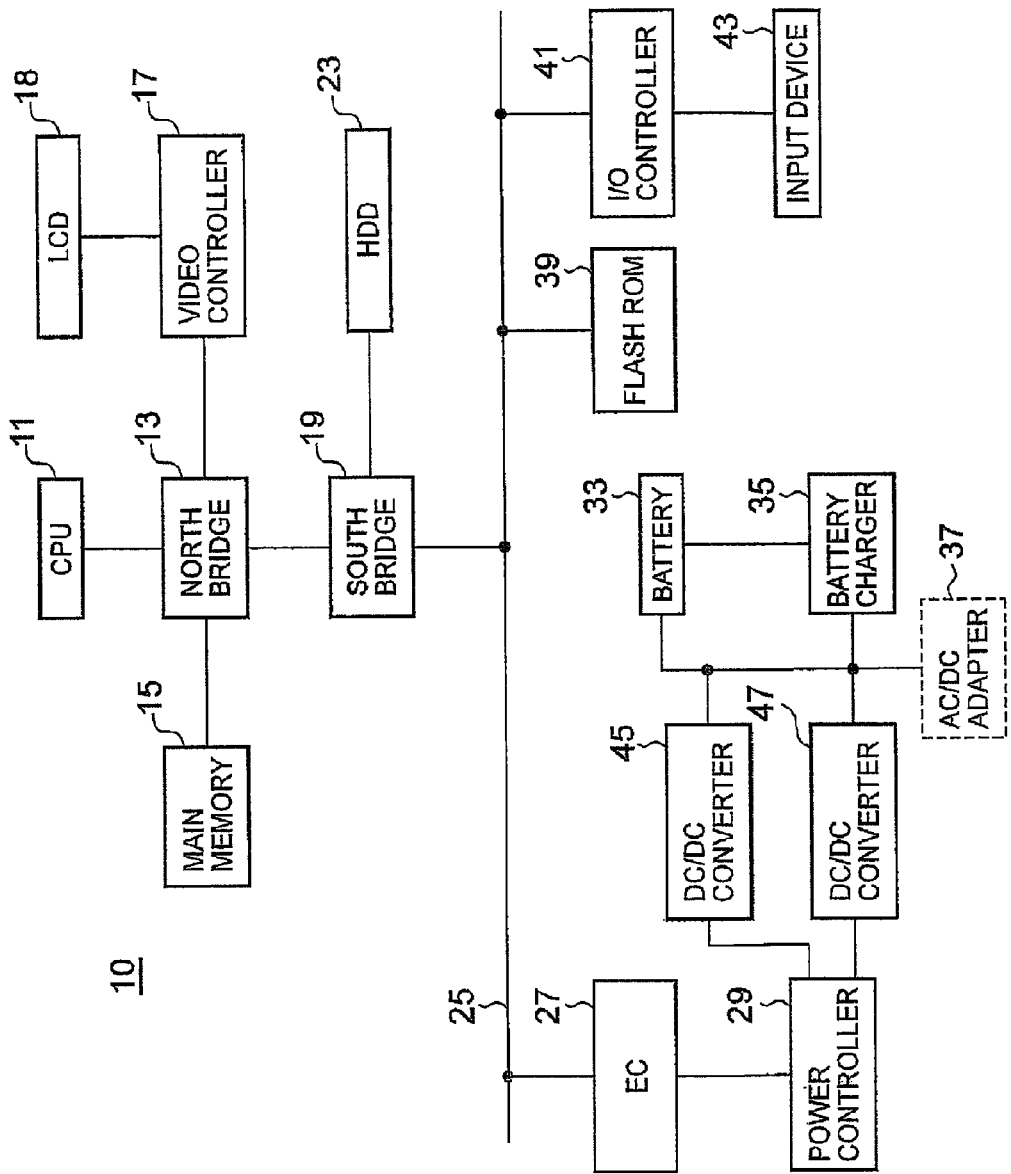
FIG. 1 is a block diagram of a notebook PC.

FIG. 1 is a block diagram of a notebook PC 10 according to a preferred embodiment of the present invention. A CPU 11 is an arithmetic processing device performing the central function of the notebook PC 10 and executes an OS, a BIOS, a device driver, or application programs. Although the CPU 11 consumes the largest amount of power among the devices mounted on the notebook PC 10, the operating system is able to decrease the consumption power by decreasing the frequency or voltage of the CPU 11 during idle time. The CPU 11 controls a north bridge 13 and various devices connected to the north bridge 13 via various buses. The north bridge 13 has a memory controller function for controlling an operation of accessing a main memory 15, a data buffer function for absorbing a difference in a data transfer rate between the CPU 11 and other devices, and the like. The main memory 15 is a volatile RAM used as a read area of programs executed by the CPU 11 and as a work area to which processed data are written. A video controller 17 is connected to the north bridge 13, provided with a video chip and a VRAM, and configured to receive a drawing command from the CPU 11 to produce images of image files to be drawn, write the images in the VRAM and to deliver images read from the VRAM to a liquid crystal display (LCD) 18 as image data.

A south bridge 19 is connected to the north bridge 13, provided with ports for a Universal Serial Bus (USB), a serial AT Attachment (ATA), an Serial Peripheral Interface (SPI) bus, a Peripheral Component Interconnect (PCI) bus, a PCI-Express bus, a Low Pin Count (LPC), and the like, and connected to devices corresponding thereto. An HDD 23 is connected to the serial ATA port of the south bridge 19. In the HDD 23, an OS, a device driver, an application program, and the like are stored.

The south bridge 19 is also connected via a LPC bus 25 to legacy devices which have been used in the notebook PC 10 from the past or devices which do not require high-speed data transmission. The LPC bus 25 is connected to an embedded controller (EC) 27, a flash ROM 39, an I/O controller 41, and the like. The EC 27 is a microcomputer configured by an 8 to 16 bit CPU, a ROM, a RAM, and the like, and is further provided with a multi-channel A/D input terminal, a multi-channel D/A output terminal, a timer, and a digital input/output terminal.

The EC 27 is connected to a power controller 29. The power controller 29 is a semiconductor logic circuit for controlling the electrical power supplied to the devices mounted on the notebook PC 10. The power controller 29 is connected to DC/DC converters 45 and 47 that are switching regulators having the features of the present invention. The DC/DC converter 45 is configured to supply electrical power exclusively to the CPU 11 with an output voltage of DC 1 V. The DC/DC converter 47 is configured to supply electrical power to devices other than the CPU 11 with an output voltage of DC 5 V.

The DC/DC converters 45 and 47 are supplied with voltage of DC 20 V from an AC/DC adapter 37, and during power outage, are supplied with voltage of DC 10.8 V to 16.8 V from a battery 33. The AC/DC adapter 37 is connected to the notebook PC 10 and is configured to convert an AC voltage into a DC voltage of 20 V to supply electrical power to a battery charger 35 for charging the DC/DC converters 45 and 47 and the battery 33. The flash ROM 39 is a nonvolatile memory in which the stored contents are electrically rewritable, and which stores therein a device driver for controlling the I/O device, a system BIOS for managing power, temperature of a casing, or the like so as to comply with the Advanced Configuration and Power Interface (ACPI) specifications, a Power-On Self Test (POST) for performing tests or initialization of hardware components during activation of the notebook PC 10, and the like. The I/O controller 41 is connected to an input device 43 such as a keyboard or a mouse.

The notebook PC 10 has multiple power supply modes referred to as a suspended state or a hibernation state, in addition to a power-ON state. The suspended state corresponds to the ACPI S3 state and the hibernation state corresponds to the ACPI S4 state. The suspended state refers to a function capable of saving, in the main memory 15, the application or system states immediately before the operation of the notebook PC 10 is stopped so as to recover the saved state from the main memory 15 when the operation is continued later, thereby enabling the tasks to be resumed quickly. In this operation mode, electrical power is supplied to the minimum necessary devices such as, for example, the EC 27, the south bridge 19, the power controller 29, and the DC/DC converter 47, which are necessary for holding stored contents in the main memory 15 or, if they support wake on LAN function, executing the stored contents.

In the hibernation state, the application or system states immediately before the operation of the notebook PC 10 is stopped are stored in the HDD 23 and the supply of electrical power to most devices including the main memory 15 is stopped. In the hibernation state, the power consumption is decreased more than the suspended state. In the suspended state and the hibernation state, the load of the DC/DC converter 47 becomes extremely small. When the notebook PC 10 transitions from the power-on state to the suspended state, the operating system detects the action of a lid switch accompanied by opening/closing of a casing, a keyboard operation, or a lapse of a predetermined idle time detected by a timer and instructs an ACPI BIOS stored in the flash ROM 39 at which point the ACPI BIOS controls the power controller 29 via the EC 27. The power controller 29 controls an output circuit of the DC/DC converter 47 so that electrical power is supplied only to the devices which are defined for the power supply mode.

In the suspended state or the hibernation state, since the notebook PC 10 does not operate for actual tasks, the DC/DC converter 45 stops operating and the DC/DC converter 47 is in the light load state, but in the case of mobile use, a user carries the notebook PC 10 to a destination place while being powered by the battery 33. Moreover, if the consumption power during the light load state is large, when the user begins to use the notebook PC 10, the user may sometimes feel inconvenienced regarding the use time because of the small remaining capacity of the battery 33. Therefore, there is a need in the notebook PC 10 for achieving a reduction in the power consumption loss particularly in a light load state such as in the suspended state or the hibernation state. Thus, the DC/DC converter 47 is necessary to improve the efficiency thereof in the light load state.

[Configuration of DC/DC Converter]

Figures 2, 3:
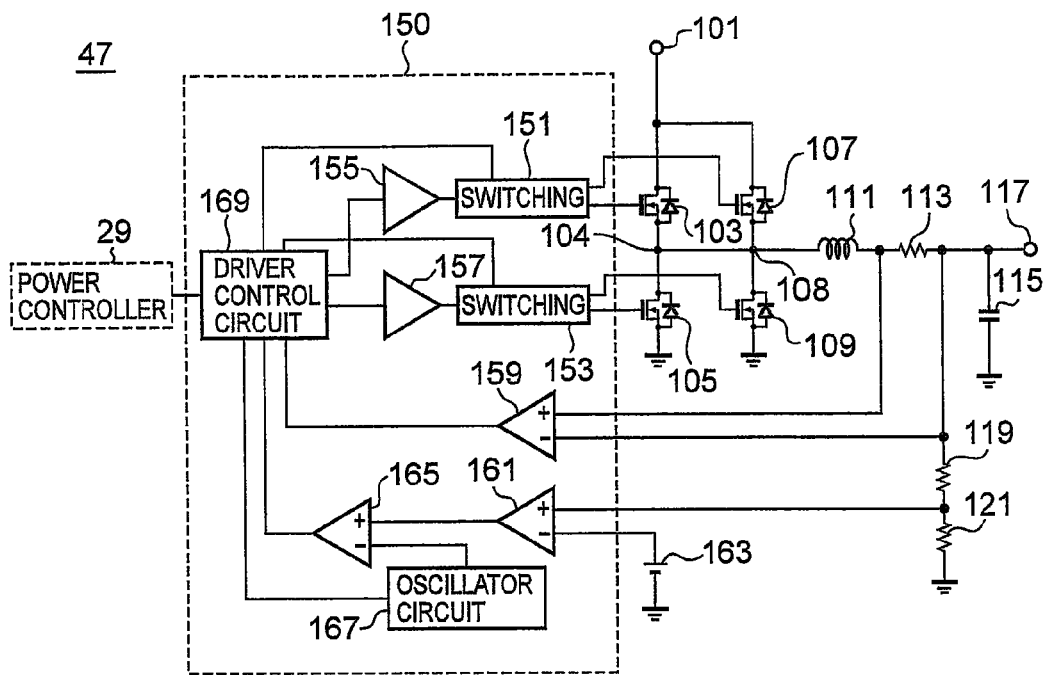
FIG. 2 is a block diagram of a DC/DC converter within the notebook PC from FIG. 1, according to a first embodiment.
FIG. 3 is a table showing characteristic values of an FET.

FIG. 2 is a block diagram of the DC/DC converter 47 according to a preferred embodiment. The DC/DC converter 47 is a synchronous rectification, non-insulating, buck (stepdown) switching regulator. The DC/DC converter 47 has an input terminal 101 to which an input voltage Vin is applied from the AC/DC adapter 37 or the battery 33. The input terminal 101 is connected to the drain of a heavy-load, highside FET 103 and the drain of a light-load high-side FET 107. The FET 103 has a source connected to the drain of a heavyload, low-side FET 105 at an output portion 104. The FET 107 has a source connected to the drain of a light-load, low-side FET 109 at an output portion 108. The sources of the low-side FETs 105 and 109 are connected to the ground.

The output portions 104 and 108 are connected to one terminal of an inductor 111, the other terminal of the inductor 111 is connected to one terminal of a sense resistor 113, and the other terminal of the sense resistor 113 is connected to an output terminal 117. The output terminal 117 is connected to a load, and an output voltage Vout is output therefrom. Moreover, series-connected bleeder resistors (or voltage-divider resistors) 119 and 121 and a smoothing capacitor 115 are connected between the other terminal of the sense resistor 113 and the ground. All the FETs 103, 105, 107, and 109 are switching elements which are configured by MOSFETs. The inductor 111, the sense resistor 113, the bleeder resistors 119 and 121, and the smoothing capacitor 115 constitute an output circuit of the DC/DC converter 47.

Next, the configuration of a PWM controller 150 which performs switching control of the FETs 103, 105, 107, and 109 will be described. The PWM controller 150 performs PWM switching control in a synchronous rectification mode by selecting either one of a combination of the high-side FET 103 and the low-side FET 105 and a combination of the high-side FET 107 and the low-side FET 109. The PWM controller 150 is mainly comprised of operational amplifiers 159 and 161, a comparator 165, an oscillator circuit 167, a driver control circuit 169, a high-side driver 155, a low-side driver 157, a high-side switching circuit 151, and a low-side switching circuit 153.

The operational amplifier 159 has a non-inverting input being connected to the one terminal of the sense resistor 113 and an inverting input thereof being connected to the other terminal of the sense resistor 113. The output of the operational amplifier 159 is connected to the driver control circuit 169. The operational amplifier 159 is configured to amplify and output an open-circuit voltage of the sense resistor 113 corresponding to an output current. The operational amplifier 159 and the sense resistor 113 constitute an output current measurement circuit. The operational amplifier 161 has a non-inverting input thereof connected to a voltage-side terminal of the bleeder resistor 121 and an inverting input connected to the ground via a reference voltage source 163. The output of the operational amplifier 161 is connected to a non-inverting input of the comparator 165. The operational amplifier 161 is configured to amplify and output the difference between an output voltage Vout divided by the bleeder resistor 119 and 121 and a reference voltage Vref which is the voltage of the reference voltage source 163.

The inverting input of the comparator 165 is connected to the oscillator circuit 167. The oscillator circuit 167 is configured to output a 400-KHz triangular wave signal in order to set the switching frequency of the DC/DC converter 47 to 400 KHz. The comparator 165 is configured to compare the output of the operational amplifier 161 with the output of the oscillator circuit 167 to output a signal, which determines a duty ratio for maintaining the output voltage Vout to a predetermined value, to the driver control circuit 169. The high-side switching circuit 151 is connected to the high-side driver 155, the driver control circuit 169, and the gates of the high-side FETs 103 and 107. The high-side switching circuit 151 is configured to selectively connect the output of the high-side driver 155 to either one of the FET 103 and the FET 107 based on a signal from the driver control circuit 169. The low-side switching circuit 153 is connected to the low-side driver 157, the driver control circuit 169, and the gates of the low-side FETs 105 and 109. The low-side switching circuit 153 is configured to selectively connect the output of the low-side driver 157 to either one of the FET 105 and the FET 109 based on the signal from the driver control circuit 169.

The high-side driver 155 and the low-side driver 157 apply voltages for causing the high-side FETs 103 and 107 and the low-side FETs 105 and 109, respectively, to performing high-speed switching operations to the gates of the respective FETs. The driver control circuit 169 is connected to the devices constituting the PWM controller 150 and activates or stops the DC/DC converter 47 in accordance with instructions from the power controller 29. The driver control circuit 169 determines whether a present load state is a heavy load state or a light load state based on the output of the operational amplifier 159. When the present load state is the heavy load state, the driver control circuit 169 controls the high-side switching circuit 151 and the low-side switching circuit 153 so that the FETs 103 and 105 are operated. When the present load state is the light load state, the driver control circuit 169 controls the high-side switching circuit 151 and the low-side switching circuit 153 so that the FETs 107 and 109 are operated.

The driver control circuit 169 includes a shoot-through prevention circuit that prevents simultaneous turning on of the high-side FET and the low-side FET. The driver control circuit 169 performs pulse control on the high-side driver 155 and the low-side driver 157 with a PWM duty ratio determined by the output of the comparator 165 so that the FETs 103 and 105 are operated in the synchronous rectification mode in the heavy load state, and the FETs 107 and 109 are operated in the synchronous rectification mode in the light load state. At this time, the inductor 111 and the smoothing capacitor 115 function as a smoothing circuit or a filter circuit that reduces a ripple voltage or a ripple current.

In the DC/DC converter 47 having such a configuration, the FETs 107 and 109 are operated in the light load state, so that the FET loss is decreased compared to the case of operating the FETs 103 and 105 in the light load state, and the efficiency thereof is improved. In order to reduce the FET loss, it is necessary to choose a FET having characteristic values complying with the light-load circuit conditions of the DC/DC converter 47, which will be described later. In the synchronous rectification mode, the high-side FET and the low-side FET are alternately turned on/off.

During the On period or the duty period during which the high-side FET is in the on state and the low-side FET is in the off state, a current input from the input terminal 101 flows through the output portion 104 or the output portion 108 and the inductor 111 to be output to the load through the output terminal 117. During the On period, energy is stored in the inductor 111. During the Off period or the recirculation period during which the high-side FET is in the off state and the low-side FET is in the on state, the energy stored in the inductor 111 flows, as a recirculating current, through the output terminal 117, the load, and the low-side FET. The smoothing capacitor 115 supplies a ripple component of the current flowing through the output circuit during the On and Off periods, thus smoothing the current.

[FET Loss]

The FET loss produced when a MOSFET is turned on/off is mainly composed of a conduction loss, a gate charging loss, and a switching loss. The conduction loss is a loss produced by a current flowing through an FET in the on state and an on-resistance. When the conduction loss of a high-side FET is Pch and the conduction loss of a low-side FET is Pcl, they can be calculated by Equations (1) and (2), respectively:

$$Pch = D \times Io^2 \times Ron \times \alpha \qquad (1)$$

$$Pcl = (1-D) \times Io^2 \times Ron \times \alpha \qquad (2)$$

In Equations (1) and (2), D is a duty ratio representing the percentage of the on-time of the high-side FET during one cycle period during which the high-side FET and the low-side FET are alternately turned on/off, Io is an effective value of an output current or a load current, Ron is an on-resistance of an FET, and $\alpha$ is a constant. As shown in Equations (1) and (2), the conduction loss Pc is proportional to a conduction time, the square of the load current, and the on-resistance. The gate charging loss Pgc is a loss produced when charging the gate capacitance of a FET and can be calculated by Equation (3) with respect to the high-side FET and the low-side FET, as follows:

$$Pgc = Vgs \times Qg \times Fsw \qquad (3)$$

In Equation (3), Vgs is a gate-source voltage, Qg is a gate charge amount, and Fsw is a switching frequency. As shown in Equation (3), the gate charging loss Pgc is proportional to the gate-source voltage, the gate charge amount, and the switching frequency. The switching loss Psw is a loss which is produced by a gate-source voltage during the transient period during which a FET is turned on/off and a current flowing during the transient period, and which occurs only in the high-side FET, and can be calculated by Equation (4):

$$Psw = \beta \times Vin \times Io \times (tr+tf) \times Fsw \qquad (4)$$

In Equation (4), $\beta$ is a constant and Vin is an input voltage applied to a high-side FET, Io is an output current, tr is a turn-on time, tf is a turn-off time, and Fsw is a switching frequency. The sum of the turn-on time and the turn-off time is a switching time. As shown in Equation (4), the switching loss Psw is proportional to the input voltage, the output current, the switching time, and the switching frequency.

At the moment when the high-side FET and the low-side FET are switched therebetween, the shoot-through prevention circuit forms a dead time so as to prevent a current from flowing towards the ground, whereby both FETs are turned off temporarily. Therefore, during the times when the low-side FET is turned on, the input voltage Vin and the output current Io do not overlap. Moreover, during the times when the recirculating current flows, since the parasitic diode of the low-side FET will be active and the inductor voltage will not be applied, no switching loss will be produced in the low-side FET.

It should be understood that FIG. 2 only illustrates the primary hardware constructions related to the present invention. Several blocks shown in the drawing may form a single integrated circuit or device, or one block may be divided into multiple integrated circuits or devices, and these configurations are also included within the scope of the present invention.

[Choosing of FET Characteristic Values]

Next, a method of choosing the characteristic values of an FET in order to reduce the light-load FET loss will be described. FIG. 3 is a table showing the characteristic values of the FETs 103, 105, 107, and 109 used in the DC/DC converter 47. FIGS. 4A to 4D are circuit diagrams illustrating only the connection topologies of the FETs among the constituent elements of the DC/DC converter. The reference numerals of the FETs illustrated in FIGS. 4A to 4D correspond to the numbers of the FETs illustrated in FIG. 3.

Referring now to FIG. 3, the heavy-load FETs 103 and 105 are chosen to have an on-resistance as low as possible. In the DC/DC converter 47, the FET 105 is chosen to have a lower on-resistance than the FET 103 in order to reduce the conduction loss because the duty ratio is small and the off period becomes longer when the DC/DC converter 47 is supplied with electrical power from the AC/DC adapter. Furthermore, the FET 107 is chosen to have a smaller gate charge amount than the FET 103, and the FET 109 is chosen to have a smaller gate charge amount than the FET 105.

Figure 4A:
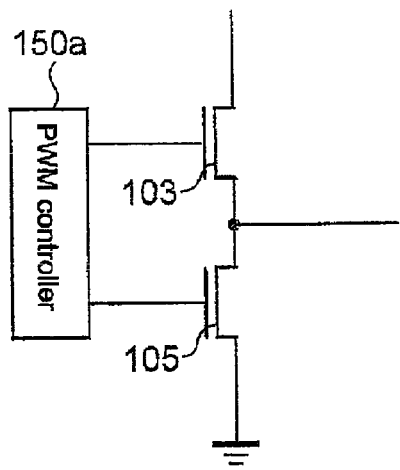
FIGS. 4A to 4D are circuit diagrams illustrating the connection topologies of FETs within the DC/DC converter from FIG. 2.
Figure 4B:
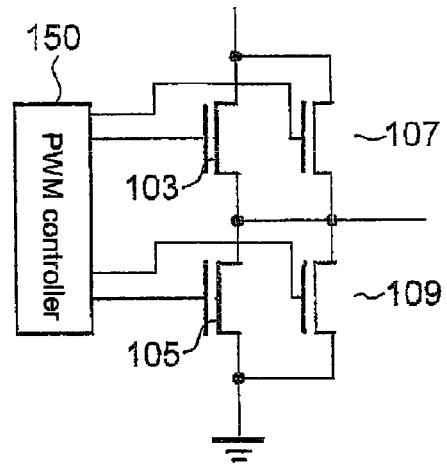
Figure 4C:
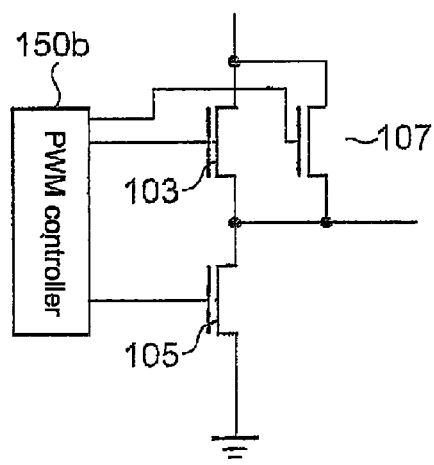
Figure 4D:
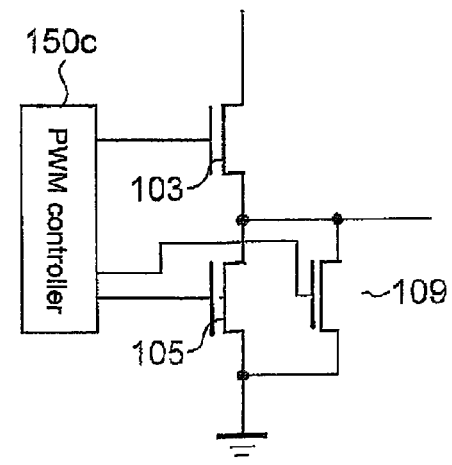

FIG. 4A illustrates conventional FET connection topology, in which the heavy-load high-side FET 103 and the heavy-load low-side FET 105 are connected to a PWM controller 150a. In this circuit, the PWM controller 150a performs switching control so that the FET 103 and the FET 105 are operated in the synchronous rectification mode in both the light load state and the heavy load state. FIGS. 4B to 4D illustrate the connection topologies according to the present invention. FIG. 4B corresponds to the connection topology of the FETs in the DC/DC converter 47 illustrated in FIG. 2.

Referring now to FIG. 4C, the light-load high-side FET 107 is connected in parallel to the heavy-load high-side FET 103. In this circuit, a PWM controller 150b performs switching control so that the heavy-load FET 103 and the heavy-load FET 105 are operated in the synchronous rectification mode in the heavy load state, and the light-load FET 107 and the heavy-load FET 105 are operated in the synchronous rectification mode in the light load state.

Referring now to FIG. 4D, the light-load low-side FET 109 is connected in parallel to the heavy-load low-side FET 105. In this circuit, a PWM controller 150c performs switching control so that the heavy-load FET 103 and the heavy-load FET 105 are operated in the synchronous rectification mode in the heavy load state, and the heavy-load FET 103 and the light-load FET 109 are operated in the synchronous rectification mode in the light load state.

FIGS. 5A and 5B show calculation examples of the FET losses for the various FET connection topologies. Specifically, FIG. 5A shows the FET losses in the light load state, and FIG. 5B shows the FET losses in the heavy load state. The symbols (A) to (D) in the table of FIG. 5A correspond to the reference numerals of the respective connection topologies in FIGS. 4A to 4D. In FIGS. 5A and 5B, based on the FET characteristic values shown in FIG. 3, the FET losses of the respective connection topologies are calculated assuming that the switching frequency is 400 KHz, the input voltage Vin is 15 V, the output voltage Vout is 5 V, the duty ratio D is 1/3, the output current Io in the light load state is 0.1 A, the output current Io in the heavy load state is 10 A, the gate-source voltage Vgs is 5 V, α is 1.3, and β is 0.5.

Referring now to FIG. 5A, when the total light-load FET loss of the high-side FET 103 and the low-side FET 105 in the conventional connection topology illustrated in FIG. 4A is assumed to be 100%, the FET losses for the FET connection topologies illustrated in FIGS. 4B, 4C, and 4D where the light-load FETs are used, are decreased to 29.3%, 74.2%, and 67.6%, respectively.

It can be understood from FIG. 5A that the gate charging loss is the dominant light-load FET loss of the DC/DC converter 47 used in the notebook PC 10. Although the gate charging loss is proportional to the gate-source voltage, the gate charge amount, and the switching frequency, since the gate-source voltage and the switching frequency are determined by the circuit conditions, it is important to choose a smaller gate charge amount as the characteristic value of the FET.

Regarding the heavy-load FETs 103 and 105 that are operated in the heavy load state, since the switching loss is not produced in the low-side FET 105, as is clear from FIG. 5B, it is important to choose a FET having a small on-resistance to reduce the conduction loss. Furthermore, since the duty ratio is small, it is preferable that the low-side FET 105 has an on-resistance as low as possible. Therefore, in order to reduce the light-load FET loss for the connection topologies illustrated in FIGS. 4B to 4D compared to that of the connection topology illustrated in FIG. 4A, the light-load FET may have a large on-resistance as long as it has a smaller gate charge amount than the heavy-load FET. In the connection topology illustrated in FIG. 4B, when the gate charge amount Qg of each the FETs 107 and 109 of FIG. 3 is decreased to 80% of that of the FETs 103 and 105, the total FET loss is calculated as 66.1 mW. Therefore, the gate charge amount of each of the light-load, high-side and low-side FETs 107 and 109 is preferably set to be equal to or smaller than 80% of the gate charge amount of the corresponding heavy-load FETs 103 and 105.

[Example of Changing Inductance Value]

Figure 6:
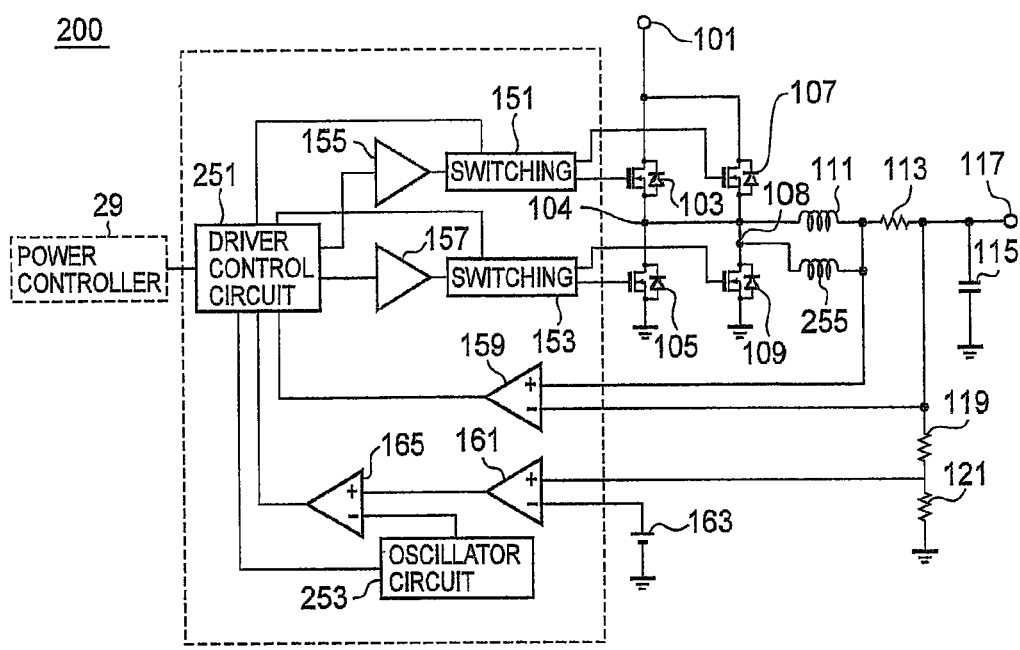
FIG. 6 is a block diagram of a DC/DC converter within the notebook PC from FIG. 1, according to a second embodiment.

Next, a DC/DC converter 200 which adds additional features to the DC/DC converter 47 illustrated in FIG. 2 in order to improve the efficiency in the light load state will be described. FIG. 6 is a schematic block diagram illustrating the configuration of the DC/DC converter 200 according to an embodiment of the present invention. In FIG. 6, the same configurations as those of FIG. 2 will be denoted by the same reference numerals and description thereof will be omitted. The configuration of FIG. 6 is different from that of FIG. 2 in that an inductor 255 is added, the output portion 104 of the heavy-load FETs 103 and 105 is connected to the inductor 111, the output portion 108 of the light-load FETs 107 and 109 is connected to the inductor 255, and the driver control circuit 251 is configured to be capable of varying the oscillation frequency of the oscillator circuit 253.

The inductance value of the inductor 255 is set to be twice the inductance value of the inductor 111, and the oscillator circuit 253 is configured to be capable of outputting two triangular wave signals having the frequencies of 400 kHz and 200 kHz. The driver control circuit 251 decreases the oscillation frequency of the oscillator circuit 253 to 200 kHz at the time of switching the high-side switching circuit 151 and the low-side switching circuit 153 to be connected to the light-load FETs 107 and 109, respectively, based on the output of the operational amplifier 159. By doing so, even when the switching frequency is decreased, the ripple voltage can be maintained at the value before the frequency is decreased. In other words, by decreasing the switching frequency in addition to using the light-load FET while preventing any increase in the ripple voltage, it is possible to further reduce the light-load FET loss.

In the case of the connection topology illustrated in FIG. 4B, the FET loss that was 22.9 mW under the switching frequency of 400 kHz as illustrated in FIG. 5 is decreased to 11.9 mW with the configuration illustrated in FIG. 6. That is to say, since the switching frequency can be halved by providing the inductor 255, the light-load FET loss can be reduced to 11.9% for the connection topology illustrated in FIG. 4A, which operates at the frequency of 400 kHz.

Figure 7:
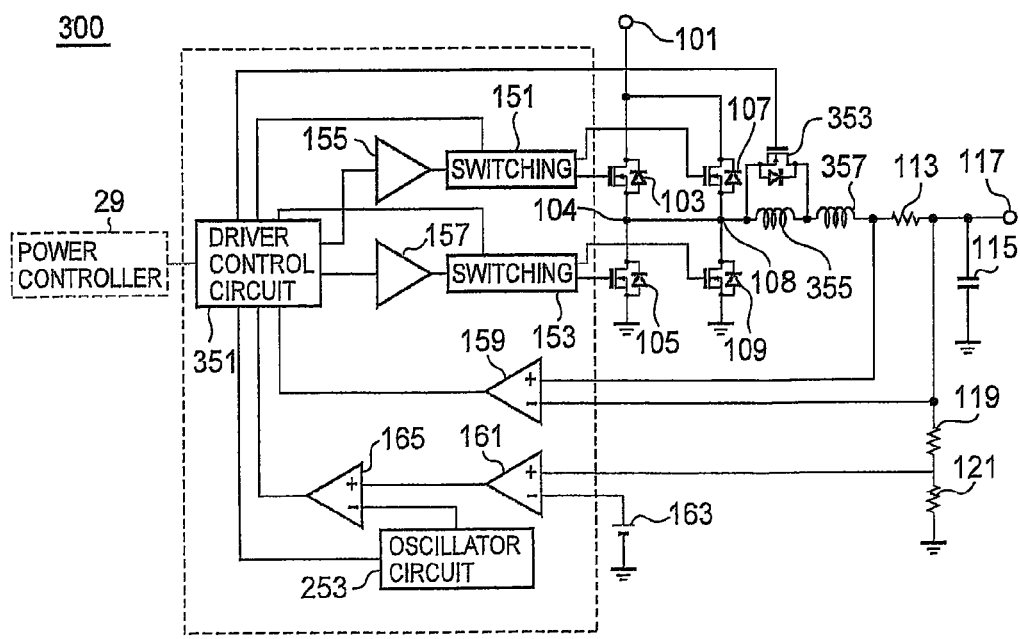
FIG. 7 is a block diagram of a DC/DC converter within the notebook PC from FIG. 1, according to a third embodiment.

FIG. 7 is a block diagram illustrating another example of a DC/DC converter, in which the inductance value of an inductor is variable. In FIG. 7, the same configurations as those of FIGS. 2 and 6 will be denoted by the same reference numerals and description thereof will be omitted. The DC/DC converter 300 is different from the DC/DC converter 200 in that the inductors 111 and 255 are omitted, inductors 355 and 357 are connected in series with one of the respective terminals thereof connected to the output portion 104 of the heavy-load FETs 103 and 105 and the output portion 108 of the light-load FETs 107 and 109, and the other terminals thereof connected to the one terminal of the sense amplifier 113. Furthermore, a bypass FET 353 is connected to both ends of the inductor 355 with a gate thereof being connected to the driver control circuit 351. The inductance value of each of the inductors 355 and 357 is the same as the inductance value of the inductor 111 illustrated in FIG. 2.

The driver control circuit 351 sets the frequency of the oscillator circuit 253 to 400 kHz and turns on the FET 353 so that only the inductor 357 contributes to the reduction of the ripple voltage at the time of switching the high-side switching circuit 151 and the low-side switching circuit 153 to be connected to the heavy-load FETs 103 and 105, respectively, based on the output of the operational amplifier 159. The driver control circuit 351 sets the frequency of the oscillator circuit 253 to 200 kHz and turns off the FET 353 at the time of switching the high-side switching circuit 151 and the low-side switching circuit 153 to be connected to the light-load FETs 107 and 109, respectively. By doing so, when the switching frequency is decreased, the total inductance value of the inductors 355 and 357 can be contributed to the reduction of the ripple voltage. The method of changing the inductance value of the inductor illustrated in FIGS. 6 and 7 can be applied to the FET connection topologies illustrated in FIGS. 4C and 4D. The inductors 355 and 357 and the FET 353 constitute a variable inductor.

A well-known operation mode called an intermittent mode is employed in order to reduce the light-load loss of a PWM switching regulator. The intermittent mode is also referred to as a skip mode, a burst mode, or a sleep mode, for example. The intermittent mode is usually used together with a PWM mode so that the PWM mode is used in the heavy load state, and the intermittent mode is used in the light load state. In the intermittent mode, the On period of the high-side FET is maintained to be constant while ignoring several control pulses during the PWM mode, and the Off period of the high-side FET is controlled so that an output voltage falls within the range of an upper limit and a lower limit.

In a switching regulator employing the intermittent mode, it is possible to reduce the switching loss by decreasing the substantial switching frequency to be lower than that in the PWM mode. In this case, the ideas of the present invention regarding the switching of FETs illustrated in FIGS. 2 and 4 and the switching of inductors illustrated in FIGS. 6 and 7 can be applied to the intermittent mode. Although the PWM mode DC/DC converter has been described by way of an example, the present invention can be applied to a PFM mode DC/DC converter. Furthermore, the present invention can be applied to a boost (step-up), polarity-inverting, insulating DC/DC converter. The DC/DC converter described with reference to FIGS. 2 to 7 can be applied to the DC/DC converter 45 that supplies electrical power to the CPU 11 illustrated in FIG. 1.

As has been described, the present invention provides a method for improving the efficiency of a DC/DC converter operating in a light load state.

While the invention has been particularly shown and described with reference to a preferred embodiment, it will be understood by those skilled in the art that various changes in form and detail may be made therein without departing from the spirit and scope of the invention.

What is claimed is:

1. A DC/DC converter comprising:
   a first heavy-load electronic switch and a second heavy-load electronic switch connected in series between an input terminal and ground at an output node;
   a light-load electronic switch connected between said input terminal and said output node;
   an inductor connected between said output node and a converter output;
   an output current measurement circuit for measuring an output current; and
   a control circuit, in response to an output of said output current measurement circuit, for selecting only said first and second heavy-load electronic switches during a heavy load state, and for selecting only said light-load electronic switch and second heavy-load electronic switch during a light load state.

2. The DC/DC converter of claim 1, wherein said first and second heavy-load electronic switches are identical.

3. A DC/DC converter comprising:
   a first heavy-load electronic switch and a second heavy-load electronic switch connected in series between an input terminal and ground at an output node;
   a light-load electronic switch connected between said output node and ground;
   an inductor connected between said output node and a converter output;
   an output current measurement circuit for measuring an output current; and
   a control circuit, in response to an output of said output current measurement circuit, for selecting only said first and second heavy-load electronic switches during a heavy load state, and for selecting only said light-load electronic switch and said first heavy-load electronic switch during a light load state.

4. The DC/DC converter of claim 1, wherein said first and second heavy-load electronic switches are identical.

* * * * *